United States Patent
Mok et al.

(10) Patent No.: US 7,661,587 B1
(45) Date of Patent: Feb. 16, 2010

(54) SYSTEMS AND METHODS FOR DETERMINING FALSE MICR

(75) Inventors: Waisum Mok, Houston, TX (US); Andre Boudousquie, Houston, TX (US)

(73) Assignee: First Data Corporation, Greenwood Village, CO (US)

( * ) Notice: Subject to any disclaimer, the term of this patent is extended or adjusted under 35 U.S.C. 154(b) by 508 days.

(21) Appl. No.: 11/321,658

(22) Filed: Dec. 29, 2005

(51) Int. Cl.
*G06K 5/00* (2006.01)

(52) U.S. Cl. .................. 235/380; 235/379; 235/375; 705/45

(58) Field of Classification Search .............. 235/380, 235/379, 487, 375; 705/45
See application file for complete search history.

(56) References Cited

U.S. PATENT DOCUMENTS

| | | | |
|---|---|---|---|
| 5,175,682 | A | 12/1992 | Higashiyama et al. |
| 5,444,616 | A | 8/1995 | Nair et al. |
| 5,679,938 | A | 10/1997 | Templeton et al. |
| 5,679,940 | A | 10/1997 | Templeton et al. |
| 5,930,777 | A | 7/1999 | Barber |
| 6,073,121 | A | 6/2000 | Ramzy |
| 6,351,735 | B1 * | 2/2002 | Deaton et al. ............ 705/14 |
| 6,392,571 | B1 | 5/2002 | Chen |
| 6,464,134 | B1 | 10/2002 | Page |
| 6,505,772 | B1 | 1/2003 | Mollett et al. |
| 6,547,132 | B1 | 4/2003 | Templeton et al. |
| 6,581,043 | B1 | 6/2003 | Wallin et al. |
| 6,611,598 | B1 * | 8/2003 | Hayosh ................. 380/54 |
| 6,769,615 | B2 | 8/2004 | Resseguie |
| 7,092,561 | B2 | 8/2006 | Downs |
| 7,175,074 | B2 | 2/2007 | Mejias et al. |
| 2002/0040344 | A1 * | 4/2002 | Preiser et al. ........... 705/42 |
| 2002/0162003 | A1 | 10/2002 | Ahmed |
| 2003/0093368 | A1 | 5/2003 | Manfre et al. |
| 2003/0130919 | A1 | 7/2003 | Templeton et al. |
| 2003/0216987 | A1 | 11/2003 | Mollett et al. |

(Continued)

FOREIGN PATENT DOCUMENTS

WO    WO 01/97134 A1    12/2001

(Continued)

OTHER PUBLICATIONS

Disclosure Statement Under 37 C.F.R. § 1.56 for U.S. Appl. No. 11/321,658.

(Continued)

*Primary Examiner*—Edwyn Labaze
(74) *Attorney, Agent, or Firm*—Sutherland Asbill & Brennan LLP

(57) ABSTRACT

Systems and methods are disclosed, where check transaction risks can be determined based on a pattern of changes in identifier information such as MICR field information and driver license number. A MICR field on a given check includes a routing transit number and an account number. Some fraudulent check transactions involve a pattern of alterations of the MICR field, such as changing, adding, or removing of one or more digits or characters of the account number or the routing transit number. Various embodiments of systems and methods can be configured to detect such pattern of changes in the MICR field, thereby facilitating detection of fraudulent check transactions. Various techniques of the present disclosure can be used to detect fraudulent electronic check transactions such as web-based transactions, as well as paper check transactions.

56 Claims, 11 Drawing Sheets

U.S. PATENT DOCUMENTS

| | | |
|---|---|---|
| 2003/0216988 A1 | 11/2003 | Mollett et al. |
| 2003/0217014 A1 | 11/2003 | Mollett et al. |
| 2003/0225686 A1 | 12/2003 | Mollett et al. |
| 2003/0225695 A1 | 12/2003 | Park et al. |
| 2005/0261926 A1 | 11/2005 | Hartridge |

FOREIGN PATENT DOCUMENTS

| | | | |
|---|---|---|---|
| WO | WO 03/042790 A2 | 5/2003 | |
| WO | WO 03/083751 A1 | 10/2003 | |

OTHER PUBLICATIONS

International Search Report & Written Opinion for PCT/US07/77152 dated Sep. 23, 2008.

Supplemental Disclosure Statement Under 37 C.F.R. § 1.56 for U.S. Appl. No. 11/321,658.

* cited by examiner

Example MICR information

```
                            ╱ 220
┌─────────────────────────────────────────┐
│ John Doe              December 10, 2005 │
│                                         │
│ Pay to: ABC                    $100.95  │
│                                         │
│   ⦁123456789⦁ 1234567830 ‖⦁             │        FIG. 8A
└─────────────────────────────────────────┘
                            ↑
                    ╱ 222   228
┌─────────────────────────────────────────┐
│ John Doe              December 12, 2005 │
│                                         │
│ Pay to: DEF                    $200.00  │
│                                         │
│   ⦁123456789⦁ 1234567850 ‖⦁             │        FIG. 8B
└─────────────────────────────────────────┘
                            ↑
                    ╱ 224   228
┌─────────────────────────────────────────┐
│ John Doe              December 14, 2005 │
│                                         │
│ Pay to: WXY                    $400.50  │
│                                         │
│   ⦁123456789⦁ 1234567880 ‖⦁             │        FIG. 8C
└─────────────────────────────────────────┘
                            ↑
                    ╱ 226   228
┌─────────────────────────────────────────┐
│ John Doe              December 15, 2005 │
│                                         │
│ Pay to: XYZ                    $300.00  │
│                                         │
│   ⦁123456789⦁ 1234567890 ‖⦁             │        FIG. 8D
└─────────────────────────────────────────┘
                            ↑
                            228
```

230

CHECK/ACH AUTHORIZATION
Name: John Doe
Address: 123 Main St.
City: Anytown  State: TX  ZIP: 76543
Phone: 713-555-4321
PAY TO THE ORDER OF ABC  Amount $100.95
Routing code: 123456789  Account: 1234567830

CHECK/ACH AUTHORIZATION
Name: John Doe
Address: 123 Main St.
City: Anytown  State: TX  ZIP: 76543
Phone: 713-555-4321
PAY TO THE ORDER OF DEF  Amount $200.00
Routing code: 123456789  Account: 1234567850

CHECK/ACH AUTHORIZATION
Name: John Doe
Address: 123 Main St.
City: Anytown  State: TX  ZIP: 76543
Phone: 713-555-4321
PAY TO THE ORDER OF WXY  Amount $400.50
Routing code: 123456789  Account: 1234567880

CHECK/ACH AUTHORIZATION
Name: John Doe
Address: 123 Main St.
City: Anytown  State: TX  ZIP: 76543
Phone: 713-555-4321
PAY TO THE ORDER OF XYZ  Amount $300.00
Routing code: 123456789  Account: 1234567890

SYSTEMS AND METHODS FOR DETERMINING FALSE MICR

BACKGROUND

1. Field

The present disclosure generally relates to the field of financial transactions, and more particularly, to systems and methods for determining risk of check transactions based on a pattern of changes in the MICR.

2. Description of the Related Art

Many check transactions are performed through an electronic medium such as Internet. Some merchants set up or associate with a web-site configured to allow transactions involving checking accounts. For example, goods and/or services can be purchased online, and payment can involve submission of information identifying the bank and the name and number of the checking account.

Many merchants that offer such payment option also subscribe to a check processing service. Such a service typically receives information about a given check transaction, and determines whether the given transaction should be authorized or declined.

Because merchants and customers typically want the service to process check transactions quickly, and/or because of the remoteness of the involved parties, electronic check transactions are susceptible to fraud that may be difficult to detect in a timely manner by the merchant and/or the service.

SUMMARY

The foregoing needs can be addressed by systems and methods configured to determine check transaction risks based on a pattern of changes in identifier information such as MICR field information and driver license number. A MICR field on a given check includes a routing transit number and an account number. Some fraudulent check transactions involve a pattern of alterations of the MICR field, such as changing or removing of one or more digits or characters of the account number or the routing transit number. Various embodiments of systems and methods can be configured to detect such pattern of changes in the MICR field, thereby facilitating detection of fraudulent check transactions. Various techniques of the present disclosure can be used to detect fraudulent electronic check transactions such as web-based transactions, as well as paper check transactions.

One embodiment of the present disclosure relates to a method for detecting a fraudulent check transaction. The method includes obtaining information about a new MICR field associated with a first check transaction, where the new MICR field having a first sequence of digits or characters. The method further includes searching for a pattern of change in sequences of digits or characters among the new MICR field and at least one existing MICR field associated with at least one previous check transaction, where the at least one existing MICR field having the same number of digits or characters as the new MICR field. The method further includes determining that the first check transaction is likely a fraudulent transaction if the change in sequences of digits or characters includes a change involving a selected digit.

In one embodiment, the change involving the selected digit or character is the only change in sequences of digits or characters. In one embodiment, the change involving the selected digit includes an increment or decrement of the selected digit.

In one embodiment, the selected digit is part of an account number portion of the corresponding MICR field. In one embodiment, the selected digit is part of a routing transit number portion of the corresponding MICR field.

In one embodiment, the information about the new MICR field is obtained via a point-of-sale device. In one embodiment, information about the new MICR field is obtained via an internet-based website configured to perform check transactions.

In one embodiment, information about the at least one existing MICR field is obtained from a database. In one embodiment, the at least one previous check transaction includes a check transaction that occurred during a specified period in the past. In one embodiment, specified period can be, for example, seven days.

Another embodiment of the present disclosure relates to a method for processing a check transaction. The method includes obtaining information about a new MICR field associated with a first check transaction. The method further includes obtaining a pattern of change among the new MICR field and at least one existing MICR field associated with at least one previous check transaction, where the at least one existing MICR field having the same number of digits or characters as the new MICR field. The method further includes assigning a first risk value to the first transaction if the pattern of change involves a change in selected one or more digits or characters of a selected portion of the new MICR field and the at least one existing MICR field for a previous check transaction.

In one embodiment, the information about the new MICR field is obtained via a point-of-sale device. In one embodiment, information about the new MICR field is obtained via an internet-based website configured to perform check transactions.

In one embodiment, information about the selected MICR field is obtained from a database. In one embodiment, the at least one previous check transaction includes at least one transaction that occurred during a specified period in the past. In one embodiment, the specified period can be, for example, seven days.

In one embodiment, the change in selected one or more digits or characters is the only change among the new MICR field and at least one existing MICR field. In one embodiment, the change in selected one or more digits or characters includes a change in selected one digit. In one embodiment, the first check transaction is considered to be fraudulent if the change in selected one digit includes an increment or decrement in the value of the selected one digit.

In one embodiment, the selected portion of the new MICR field and the at least one existing MICR field includes a routing transit number. In one embodiment, the selected portion of the new MICR field and the at least one existing MICR field includes an account number field.

In one embodiment, the method further includes determining how to proceed with the first check transaction based at least in part on the first risk value. In one embodiment, the first check transaction is authorized if the first risk value is within a range of an acceptable risk. In one embodiment, the first check transaction is declined if the first risk value is within a range of an unacceptable risk. In one embodiment, additional information about the first check transaction is requested if the first risk value is within a range of a questionable risk.

In one embodiment, the method further includes providing a communication with a party requesting the first check transaction based at least in part on the first risk value. In one embodiment, the communication includes a message transmitted to a point-of-sale device. In one embodiment, the message includes a request to inspect the check for signs of alteration of one or more digits or characters of the first MICR field. In one embodiment, the message includes a request to call a telephone number to proceed with the first check transaction.

In one embodiment, the communication includes a message transmitted to the party using an internet-based website to request the first check transaction. In one embodiment, the message includes a request to re-enter the first MICR field. In one embodiment, the message includes a request to call a telephone number to proceed with the first check transaction.

Yet another embodiment of the present disclosure relates to a system for processing a check transaction. The system includes an interface component configured to obtain information about a new MICR field associated with a first check transaction. The system further includes a risk component configured to obtain a pattern of change among the new MICR field and at least one existing MICR field associated with at least one previous check transaction, where the at least one existing MICR field having the same number of digits or characters as the new MICR field. The risk component is further configured to assign a first risk value to the first transaction if the pattern of change involves a change in selected one or more digits or characters of a selected portion of the new MICR field and the at least one existing MICR field.

In one embodiment, the information about the new MICR field is obtained via a point-of-sale device. In one embodiment, information about the new MICR field is obtained via an internet-based website configured to perform check transactions.

In one embodiment, information about the selected MICR field is obtained from a database. In one embodiment, the at least one previous check transaction includes at least one transaction that occurred during a specified period in the past. In one embodiment, the specified period can be, for example, seven days.

In one embodiment, the change in selected one or more digits or characters is the only change in change among the new MICR field and at least one existing MICR field. In one embodiment, the change in selected one or more digits or characters includes a change in selected one digit. In one embodiment, the first check transaction is considered to be fraudulent if the change in selected one digit includes an increment or decrement in the value of the selected one digit.

In one embodiment, the selected portion of the new MICR field and the at least one existing MICR field includes a routing transit number. In one embodiment, the selected portion of the new MICR field and the at least one existing MICR field includes an account number field.

In one embodiment, the system further includes a processor configured so as to determine how to proceed with the first check transaction based at least in part on the first risk value. In one embodiment, the first check transaction is authorized if the first risk value is within a range of an acceptable risk. In one embodiment, the first check transaction is declined if the first risk value is within a range of an unacceptable risk. In one embodiment, additional information about the first check transaction is requested if the first risk value is within a range of a questionable risk.

In one embodiment, the system further includes an interface component configured so as to provide communication with a party requesting the first check transaction based at least in part on the first risk value. In one embodiment, the communication includes a message transmitted to a point-of-sale device. In one embodiment, the message includes a request to inspect the check for signs of alteration of one or more digits or characters of the first MICR field. In one embodiment, the message includes a request to call a telephone number to proceed with the first check transaction.

In one embodiment, the communication includes a message transmitted to the party using an internet-based website to request the first check transaction. In one embodiment, the message includes a request to re-enter the first MICR field. In one embodiment, the message includes a request to call a telephone number to proceed with the first check transaction.

Yet another embodiment of the present disclosure relates to a system for processing a check transaction. The system includes means for obtaining information about a MICR field associated with a check transaction. The system further includes means for obtaining a pattern of change in the MICR field. The system further includes means for assigning a risk value to the transaction based on the pattern of change in the MICR field.

BRIEF DESCRIPTION OF THE DRAWINGS

FIGS. 8A-8D show example checks having example changes in the account number field, indicating a likelihood that the checks may be fraudulent;

FIGS. 9A-9D show example web user interfaces having example changes in the account number field, indicating a likelihood that the transactions may be fraudulent;

These and other aspects, advantages, and novel features of the present teachings will become apparent upon reading the following detailed description and upon reference to the accompanying drawings. In the drawings, similar elements have similar reference numerals.

DETAILED DESCRIPTION OF SOME EMBODIMENTS

The present disclosure generally relates to check-related transactions. A check transaction can involve a paper check or an electronic transaction where information about a checking account is provided. Many merchants that receive checks or ACH authorizations as payments also subscribe to a check processing service. The check processing service can receive information about such check-related transaction, and determine whether or not the transaction should be accepted. Such determination can be based on an estimate of a risk associated with the transaction.

Figure 1:
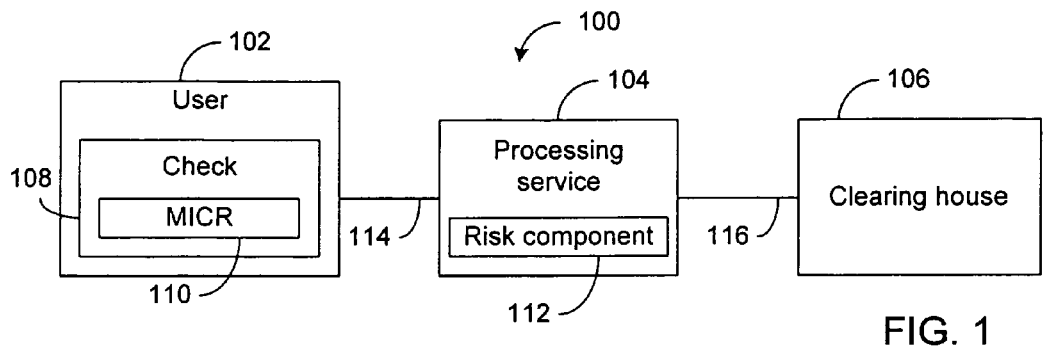
FIG. 1 shows a block diagram of one embodiment of a check processing system configured to assess a check transaction risk based at least in part on information associated with a MICR (magnetic ink character recognition) field of a check.

FIG. 1 shows a block diagram of one embodiment of a check processing system 100 that includes a check processing service 104 having a communication link 114 with a user 102. The user 102 can be, for example, a merchant who subscribes to the service 104. As shown, a check or check-related information 108 is shown to be involved with a transaction being processed by the service 104. The check (or check-related information) 108 is shown to include information about a MICR (magnetic ink character recognition) field 110, and such information can be transmitted to the service 104 for processing of the transaction. For the purpose of description herein, the check 108 can be a paper check, or information about a checking account and the transaction (for example, payee, amount, driver's license, and MICR field).

As further shown in FIG. 1, the check processing service 104 includes a risk component 112 that evaluates a risk associated with the transaction involving the check 108. In some embodiments of the present disclosure, the risk component 112 can be configured to evaluate the risk based at least in part on information about the MICR field 110.

As further shown in FIG. 1, the check processing service 104 can have a communication link 116 with a clearing house 106 such as Automated Clearing House or Federal Clearing House. In some embodiments, processing with the clearing house 106 occurs if the check transaction is authorized.

Figure 2A:
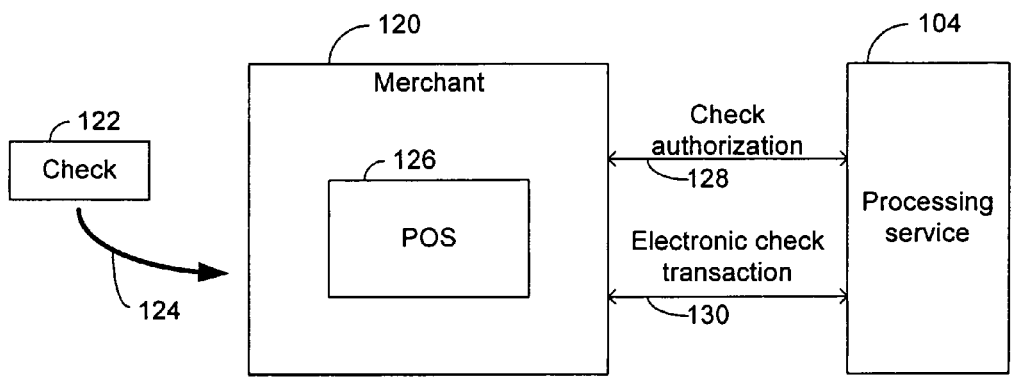
FIG. 2A shows that in one embodiment, the check transaction may involve a point-of-sale (POS) device associated with a merchant.
Figure 2B:
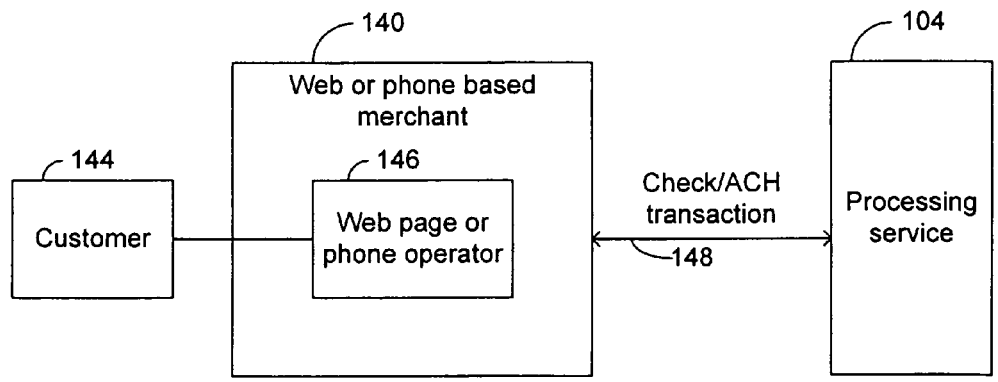
FIG. 2B shows that in one embodiment, the check transaction may be performed through an internet-based website or via a telephone.

FIGS. 2A and 2B show examples of check transaction settings. FIG. 2A shows an example transaction where a paper check 122 is received (indicated by an arrow 124) by a merchant 120. In one embodiment, the merchant 120 can have a point-of-sale (POS) device 126 configured to obtain information about the check 122 and facilitate communication with the check processing service 104. Such communication can be for purposes such as electronic transaction (indicated by an arrow 130) and/or for check authorization (indicated by an arrow 128).

FIG. 2B shows an example transaction where an electronic check transaction can occur between a customer 144 and a web page or phone operator 146 that is associated with a web-based or phone-based merchant 140. The merchant 140 is shown to be in communication with the check processing service 104 so as to facilitate, for example, check or ACH transaction 148 and/or transaction authorization.

Figure 3A:
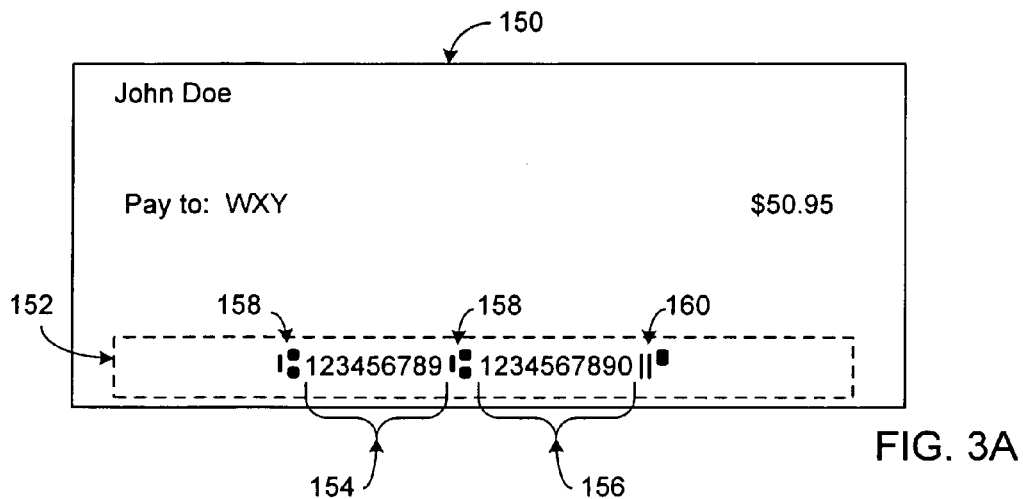
FIG. 3A shows an example MICR field of a check, from which information can be obtained to assess the transaction risk.

FIG. 3A shows an example check 150 that can be involved in the example transaction described above in reference to FIG. 2A. A check 150 typically includes information about the check-writer ("John Doe" in this example) and the payee ("WXY" in this example). The example check 150 is also shown to include an amount ("$50.95" in this example).

The example check 150 is also shown to include a MICR field 152 typically imprinted on the bottom portion of the check 150. The MICR field 152 typically includes a routing transit number 154 and an account number field 156. The routing transit number 154 typically has nine digits, with the first four indicating the Federal Reserve district and branch serving the bank on which the check 150 is drawn from; and the next four indicating the bank's identification. The routing transit number is typically positioned between two "transit" characters 158.

The account number field 156 can have different number of digits, since banks are allowed to use different formats. For example, banks can use a different number of digits for account numbers. Moreover, some banks include check numbers in this field. For a given bank, the number of digits in the account number field 156 can also vary.

Figure 3B:
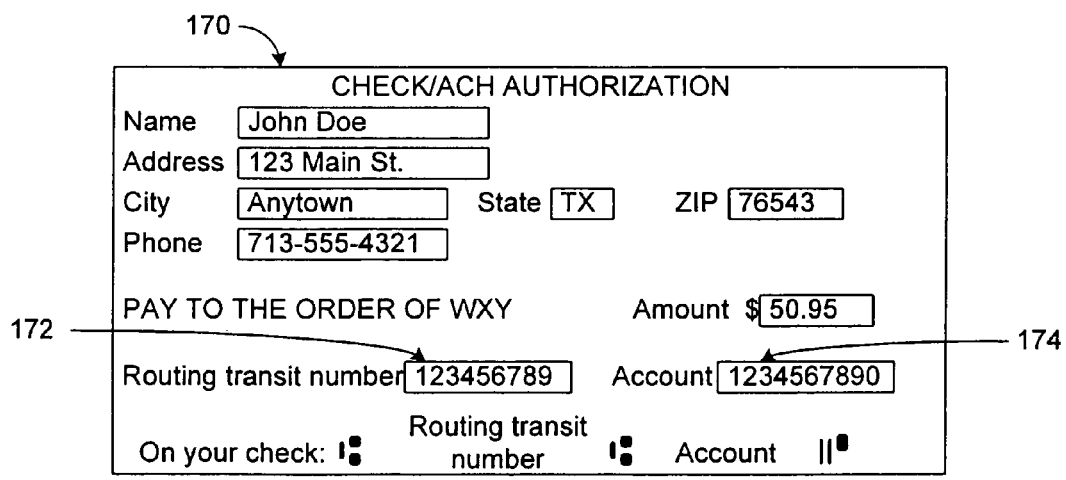
FIG. 3B shows that in one embodiment, information about the MICR field can be obtained via the internet-based website configured to perform check transactions.

FIG. 3B shows an example of an electronic transaction interface 170 that can be involved in the example transaction described above in reference to FIG. 2B. Such interface 170 can prompt for and obtain information about the customer. The example interface 170 is also shown to include an amount.

The example interface 170 is also shown to prompt for and obtain information associated with the MICR field that can be read from one of the customer's checks. Such information can include a routing transit number 172 and an account number field 174. In one embodiment, the interface 170 can include a tutorial portion that tells the customer where to find the routing transit number and the account number on one of his/her checks.

Figure 4:
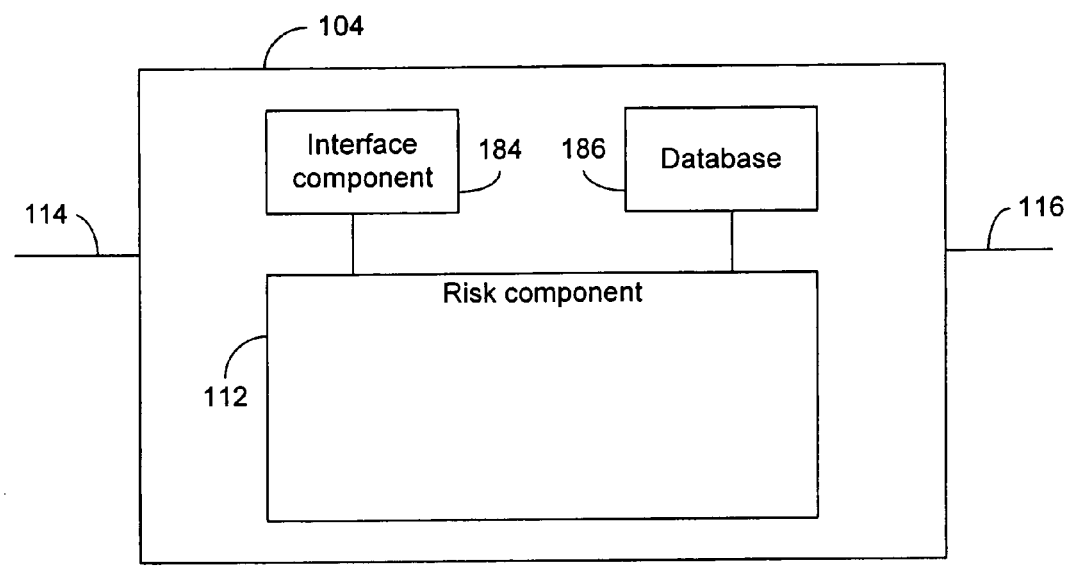
FIG. 4 shows a block diagram of one embodiment of a check processing service having a risk component configured to perform risk assessment.

FIG. 4 shows a block diagram of the check processing service 104 that can process the foregoing examples of check transactions via the communication link 114. As described above, the service 104 can interact with the clearing house (not shown in FIG. 4) via the communication link 116.

On one embodiment, the check processing service 104 includes the risk component 112 that is functionally linked to an interface component 184 and a database 186. The interface component 184 can facilitate communication with the user (not shown) and/or the clearing house (not shown). In one embodiment, the interface component 184 can facilitate communication with the user in regards to the risk assessment performed by the risk component 112. Examples of such communication are described below in greater detail.

Figure 5:
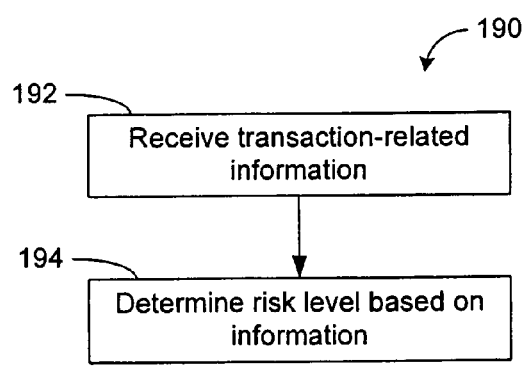
FIG. 5 shows one embodiment of a process configured to perform risk assessment based on the MICR field.

FIG. 5 shows one embodiment of a process 190 that can be performed by the check processing service 104 of FIG. 4. In a process block 192, the service receives transaction-related information (such as information about the MICR field associated with the check transaction). In a process block 194, risk assessment is performed so as to determine a risk level based on the transaction-related information.

Figures 6, 7A:
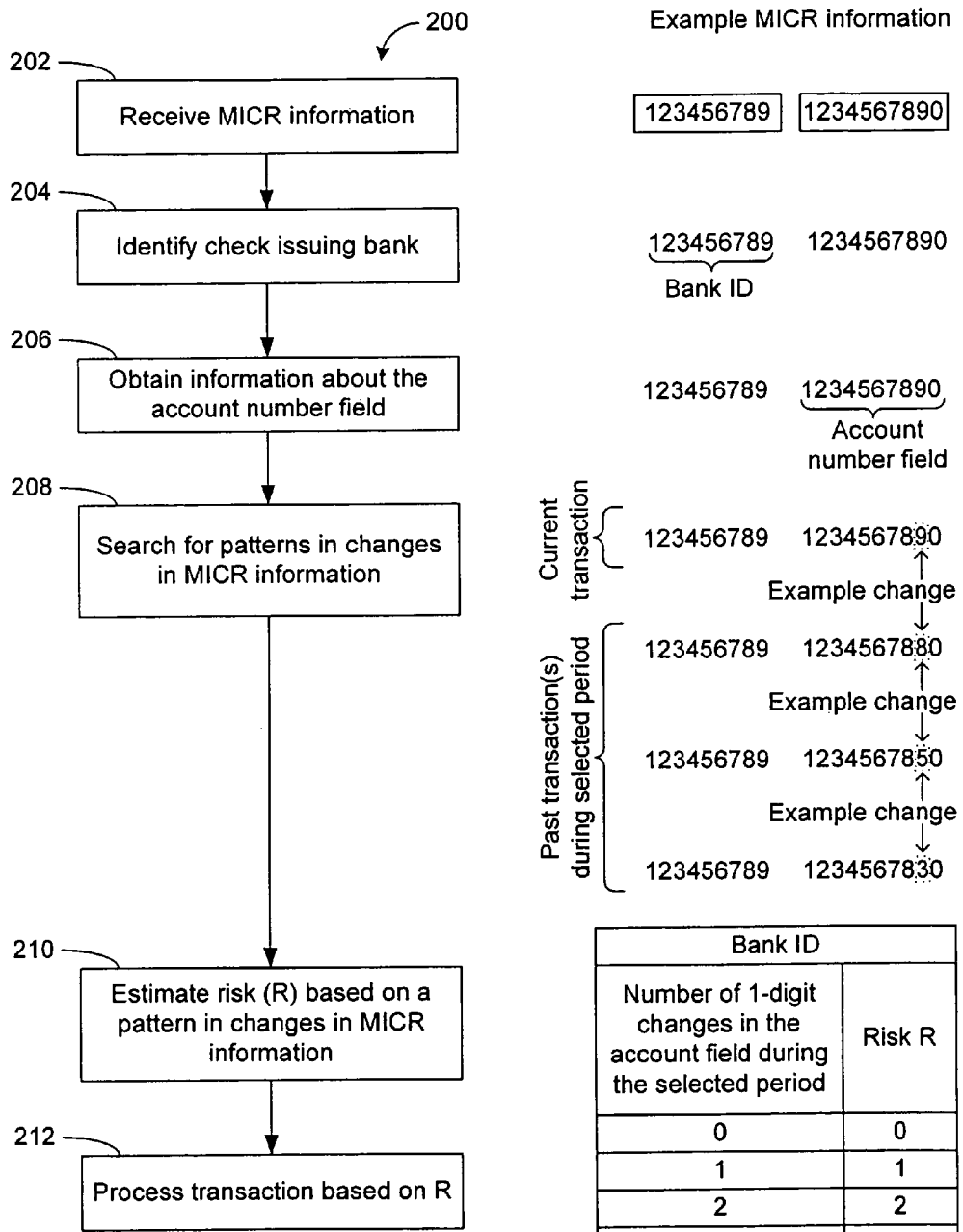
FIG. 6 shows one embodiment of a process configured to perform risk assessment based on a pattern of change in the MICR field.
FIG. 7A shows an example of a pattern of change in the account number field of the MICR, and an example of how risk can be assigned based on such pattern of change.

FIG. 6 shows one embodiment of a process 200 that is a more specific example of the process 190 of FIG. 5, where the process 200 performs risk assessment based on some pattern of change in the MICR field. FIG. 7A shows examples of a MICR field and example changes in the MICR field that can be detected as a pattern by the example process 200 of FIG. 6.

In a process block 202, the check processing service receives information about the MICR field associated with the check transaction. In the example MICR field (of the current check transaction) of FIG. 7A, "123456789" represents the routing transit number, and "1234567890" represents the account number field.

In a process block 204, the check-issuing bank is identified. In the example of FIG. 7A, "123456789" of the routing transit number identifies the bank associated with the MICR.

In a process block 206, information about the account number field is obtained. In the example of FIG. 7A, "1234567890" is identified as the account number associated with the check transaction.

In a process block 208, the process 200 searches for one or more patterns of changes in the MICR information. In one embodiment, the process 200 searches for a pattern of change in sequences of digits or characters among the current transaction and at least one existing MICR field associated with at least one previous transaction. In one embodiment, the current-transaction MICR field and the at least one existing MICR field have the same number of digits. In one embodiment, the current-transaction MICR field and the at least one existing MICR field have the same routing transit number. In the example of FIG. 7A, the current MICR field and the MICRs for three previous transactions are shown to have the same routing transit number of "123456789." In the account number field, the ninth digit is shown to be changed among the current MICR and three previous MICRs—"9" in the current MICR, and "8," "5," and "3" in the previous MICRs. In one embodiment, previous MICRs used for the pattern-searching purpose correspond to transactions that occurred during a selected period of time prior to the current transaction.

In a process block 210, the process 200 estimates a risk value R based on one or more detected patterns. In the example of FIG. 7A, an example scheme is shown where different risk values R can be assigned to different detected patterns. For example, risk R can be proportional to the number of one-digit changes in the account number during the selected period. So for the example changes shown in FIG. 7A, three changes in the ninth digit ("3" to "5" to "8" to "9") can be detected, and the risk R can be assigned a value of 3.

It will be understood that the example scheme of assigning risk R proportional to the number of one-digit changes in the account number is just an example. Risk assignment(s) based on the detected changes in the MICR field (for example, the account number) can be from any number of schemes including changes to more than one digit and/or symbols.

In one embodiment, the risk value based on the detected pattern of change may be normalized with respect to volumes of transactions associated with different banks. For example, a bank having a larger number of customers may have a greater number of changing account numbers (for example, as new account holders begin using checks) than a smaller bank. In such an example situation, the actual number of changes in account numbers (for example, increments in the account number) does not necessarily mean fraudulent activity. Thus in one embodiment, the example risk value R can be divided by $M_{norm}$, the total number of checks processed for the given bank.

In a process block 212, the current check transaction can be processed based on the value of R. As described below in greater detail, one or more steps can be implemented to address one or more risks assessed by the process 200.

Figure 7B:
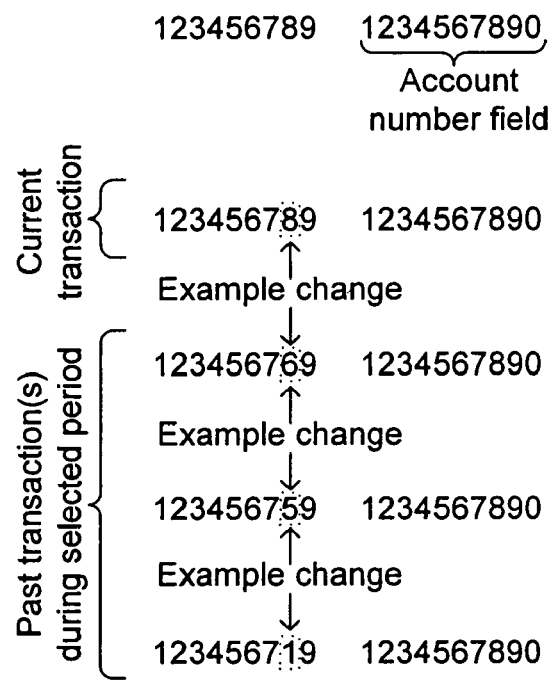
FIG. 7B shows an example of a pattern of change in the routing transit number of the MICR, and an example of how risk can be assigned based on such pattern of change.

FIG. 7B shows an example changes in the routing transit number of the MICR that can be detected in a manner similar to that described above in reference to FIGS. 6 and 7A. The current MICR field and the MICRs for three previous transactions are shown to have the same account number of "1234567890." In the routing transit number, the eighth digit is shown to be changed among the current MICR and three previous MICRs—"8" in the current MICR, and "6," "5," and "1" in the previous MICRs. Based on such a pattern, one or more values of risk R can be assigned.

In one embodiment, searching for pattern in the MICR field includes searching for pattern of changes in the account number field among current and previous check transactions having the same routing transit number. In one embodiment, searching for pattern in the MICR field includes searching for pattern of changes in the routing transit number among current and previous check transactions having the same account number.

Figures 7C, 7D:
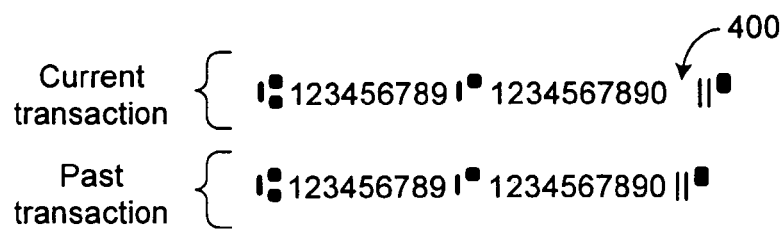
FIGS. 7C and 7D show examples of patterns of changes that can be searched for and detected.

FIGS. 7C and 7D show that searching for pattern can be performed for characters other than numbers. For example, as shown in FIG. 7C, a space 400 inserted or removed can form a pattern that can be searched for and detected. Other characters such as MICR symbols can also be considered when searching for pattern of change.

FIG. 7D shows that in one embodiment, searching for pattern can also be performed on information that are not directly related to a check, but are often used in check transactions. For example, use of driver license is a common way of identifying a check-writer. Thus in some transactions situations where driver information (or similar information) can be provided by a customer (through an interface 410 or via a phone, for example), a pattern of change in one or more characters of the driver license number can be searched for and detected. In the example shown in FIG. 7D, the last digit "9" in the current transaction 410 is shown to be changed from past transaction(s) (not shown) having the same routing transit number and/or the account number.

In some embodiments, searching for pattern of change between one or more past transactions and the current transaction may involve quantity of check transactions, as well as amounts for the checks involved. For example, for a given routing transit number and/or an account number, a pattern in the number of checks-per-day can be monitored. If there is an increase beyond some set rate, such a pattern of increase can be used to assess a risk for the current transaction. In another example, for a given routing transit number and/or an account number, a pattern in the check amount can be monitored. If there is an increase or decrease beyond some set boundaries, such a pattern can be used to assess a risk for the current transaction. In one embodiment, amount monitoring can include summing up of the check amounts from the matching previous transactions; and any sharp increase in the sum can indicate a possible pattern of fraud.

In some fraud activities involving checks, one scenario is where a number of fraudulent checks (including electronic check transactions) are submitted during some period of time. Another scenario is where the fraudulent checks involve simple changes in one digit of the MICR field, in an attempt to delay detection. Thus, various features of the present disclosure can be configured to facilitate faster detection of such fraudulent practices.

In one embodiment, the previous check transactions for pattern searching are obtained from transactions that occurred during a selected period of time prior to the current transaction. For example, previous transactions during the past seven days can be used to search for pattern of changes in the MICR field.

In one embodiment, searching for pattern of changes can involve searching for change in the same one digit. In one embodiment, pattern of sequential increase (for example, "2," "3," "4") or sequential decrease ("7," "6," "5") in the same digit is searched for.

FIGS. 8A-8D and 9A-9D show examples of patterns of changes in the MICR field that could be detected using various techniques disclosed herein. For the purpose of description of FIGS. 8 and 9, it will be assumed that the changes in the MICR field are fraudulent.

FIGS. 8A-8D show that changes in the MICR field can be on paper checks. Such fraudulent checks can result from alteration of existing checks or from new printing. Four example checks 220, 222, 224, and 226 are shown to be written and submitted to one or more merchants during a period spanning several days (December 10 to December 15). The four example checks are shown to have the ninth digit (228) of the account number that varies from check to check.

FIGS. 9A-9D show that changes in the MICR field can be made during electronic check transactions such as web-based transactions. Such fraudulent check transactions can result from changing the entries of the account numbers in successive transactions. Four example user interfaces 230, 232, 234, and 236 are shown to be filled out and submitted for transactions with one or more web-based merchants. The four example user interfaces are shown to have the ninth digit (238) of the account number that varies from interface to interface.

Figure 10:
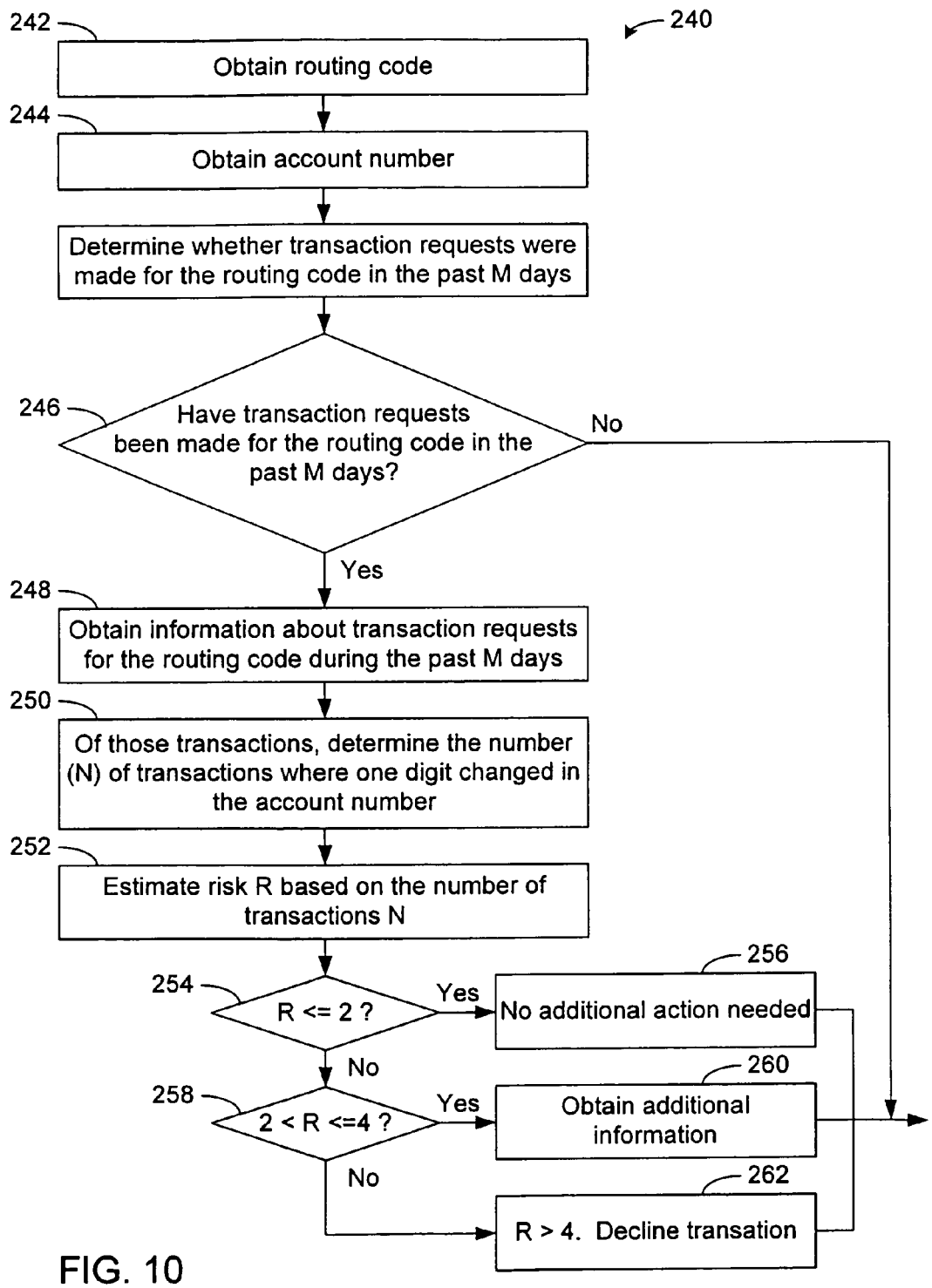
FIG. 10 shows one embodiment of an example process configured to detect one or more patterns in the MICR field so as to allow assigning of one or more levels of risks.

FIG. 10 shows one embodiment of a process 240 that can estimate a risk (R) of a check transaction based on detection of a pattern of change in the MICR field. In a process block 242, routing transit number is obtained from the MICR field. In a process block 244, account number is obtained from the MICR field. In a decision block 246, the process 240 determines whether one or more transaction requests have been made during the past M days, where the transaction(s) involved the same routing transit number. If the answer is "No," then no further action is taken by the process 240. If the answer is "Yes," then the process 240 in a process block 248 obtains information about the transaction request(s) made during the past M days, and having the same routing transit number. Of those transaction request(s) and the current transaction, the process 240 in a process block 250 determines the number (N) of transaction(s) involving one-digit changes in the account number. In a process block 252, risk R is estimated based on the value of N.

In one embodiment, the process 240 can be further configured to take different actions based on the estimated value of R. For example, in a decision block 254, the process 254 determines whether R is less than or equal to 2 (based on the example risk assigning scheme of FIG. 7A or 7B). If the answer is "Yes," then the process 240 in a process block 256 determines that the risk based on the pattern is acceptable, and no further action is taken. If the answer is "No," then the process 240 in a decision block 258 determines whether R is greater than 2 but less than or equal to 4. If the answer is "Yes," then the process 240 in a process block 260 obtains additional information. If the answer is "No," then the process 240 determines in a process block 262 that R is greater than 4 (an example selected risk level), and therefore declines the current transaction.

It will be understood that the values of risks in the process 240 of FIG. 10 are just examples. As previously described, any number of risk assigning schemes and the corresponding risk values can be used in a similar manner, where different actions can be taken depending on the risk value.

It will also be understood that a similar process can be performed where pattern of changes among the routing transit numbers can be searched.

Figure 11:
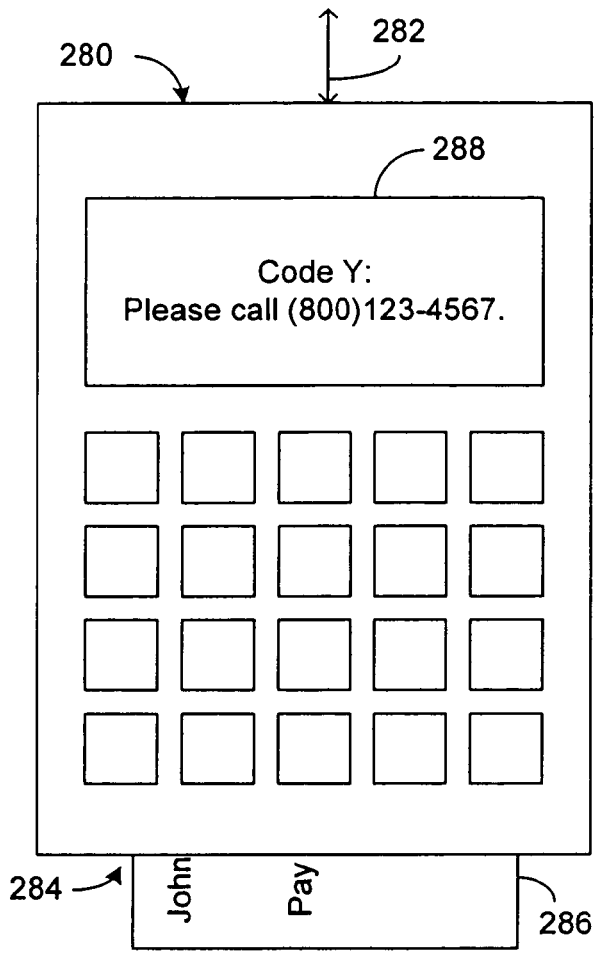
FIG. 11 shows one embodiment of a POS device configured to receive a message from the check processing service, where the message is related to the risk assessment based on the pattern of change in the MICR field.

FIG. 11 shows an example embodiment of a POS device 280 that can be configured to receive messages from the check processing service. In one embodiment, a message 288 from the check processing service (via a communication link 282) can include a request to have a human operator to call a representative of the check processing service. Such request to call can be based on an example Code "Y" that indicates to the operator that the transaction is possibly fraudulent.

In one embodiment, the POS device 280 can include a MICR reader 284 configured to read a check 286. Thus, if the check 286 is a fraudulent check (for example, the fraudulent check 226 of FIG. 8D), the above-described risk assessment can be performed, and the request for additional information (for example, process block 260 of the process 240 of FIG. 10) can result in the example message 288.

Figure 12:
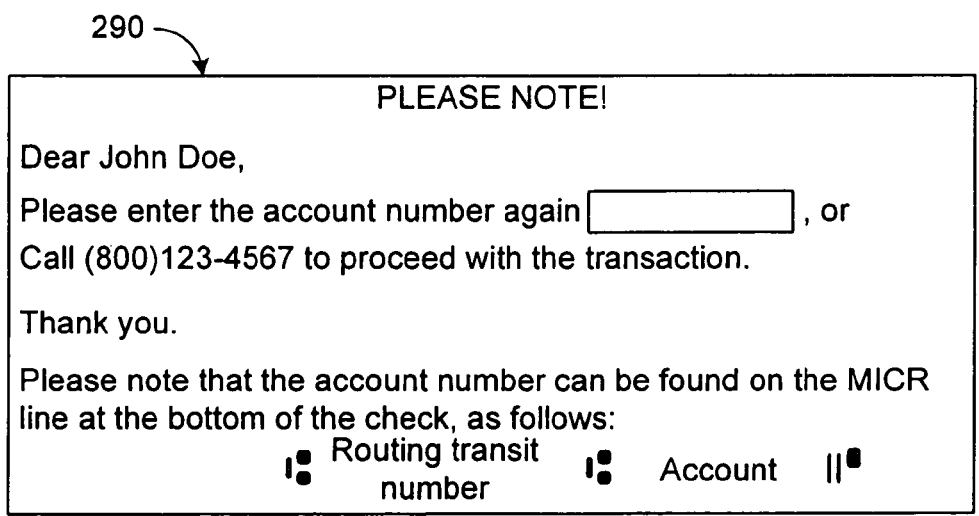
FIG. 12 shows an example of a user interface for a web-based transaction configured to receive message from the check processing service, where the message is related to the risk assessment based on the change in the MICR field.

FIG. 12 shows an example embodiment of a web user interface 290 that can be configured to receive a message from the check processing service. In one embodiment, the example message can request the web user to re-enter the account number, or call a representative of the check processing service. In one embodiment, such request for additional information can result from a process having a process block similar to the process block 260 of the process 240 described above in reference to FIG. 10.

Figure 13:
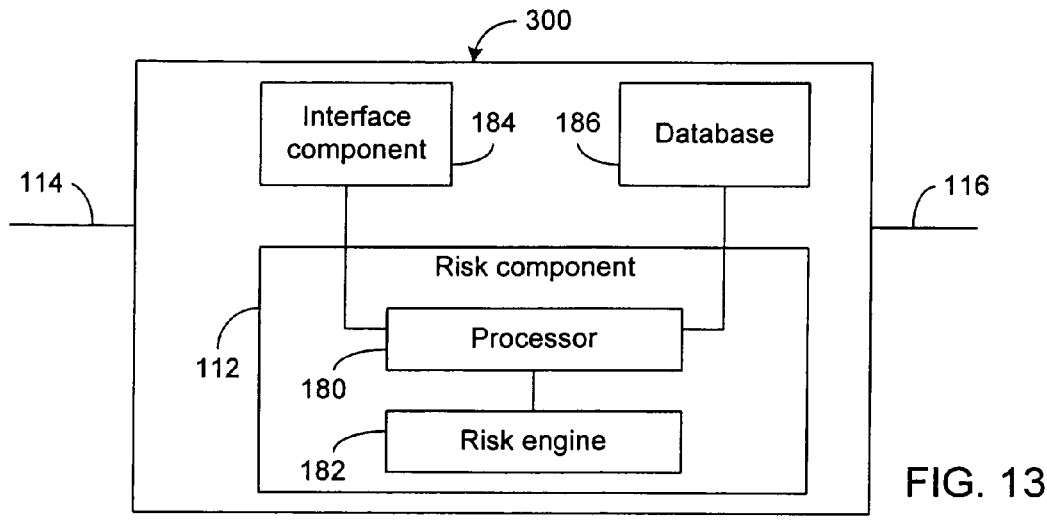
FIG. 13 shows a block diagram of one embodiment of the check processing service, where the risk component includes a risk engine configured to assess risk associated with the check transaction.

FIG. 13 shows a block diagram of an example configuration 300 of the check processing service having the risk component 112. In some embodiments various functionalities of risk assessments, as described herein, can be performed by the risk component 112 in cooperation with the interface component 184 and the database 186. For example, the database 186 can facilitate retrieval of previous transactions (whether successful or declined) for the purpose of pattern searching as described herein.

In one embodiment, the risk component 112 can include a processor 180 and a risk engine 182. The processor 180 can be configured to coordinate various functionalities involved in the risk assessment and/or processing of the check transactions. The risk engine 182 can be configured to perform the various embodiments of the risk assessment as described herein by way of examples.

Figure 14:
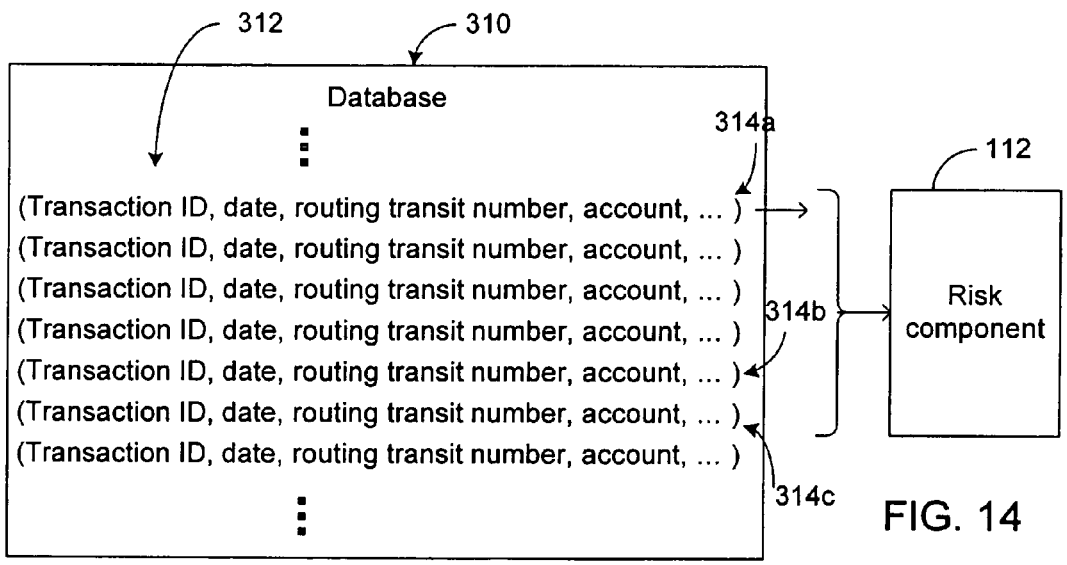
FIG. 14 shows one embodiment of a database configured to retrievably store information about transactions, so as to facilitate detection of a pattern of change in the MICR field.

FIG. 14 shows a block diagram of an example interaction between the risk component 112 and one embodiment 310 of the database (186 in FIG. 13). As shown, the example database 310 can include a plurality of transaction information 312. Each transaction can include, for example, a transaction identifier, date, routing transit number, account number, etc. A selected ones (314a, 314b, and 314c, for example) of the transaction information 312 are shown to be selected for risk assessment by the risk component 112. As described herein, the selected transaction records (314a, 314b, and 314c) can be based on transaction date, routing transit number, account number, and/or other information.

Figure 15A:
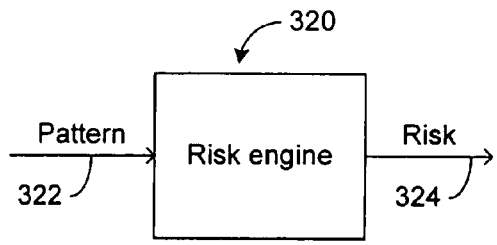
FIG. 15A shows that in one embodiment, the risk assessed by the risk engine is based on the pattern of change in the MICR field.

FIG. 15A shows a block diagram of one embodiment of a risk engine 320 that performs the risk assessment based on the pattern of change in the MICR field as described herein. Thus, an input 322 having information corresponding to a pattern of change is shown to be input to the risk engine 320, resulting in determination of a risk value 324.

Figure 15B:
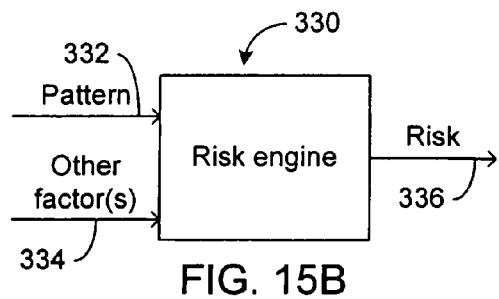
FIG. 15B shows that in one embodiment, the risk assessed by the risk engine is based on the pattern of change in the MICR field as well as other factors.

FIG. 15B shows a block diagram of one embodiment of a risk engine 330 that performs the risk assessment based on a plurality of factors. Thus, a pattern (332) of change in the MICR field as described herein is shown to be input to the risk engine 330 along with other factors 334. The risk engine 330 is shown to output an overall risk parameter 336 based on the input factors 332 and 334.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

Although the above-disclosed embodiments have shown, described, and pointed out the fundamental novel features of the invention as applied to the above-disclosed embodiments, it should be understood that various omissions, substitutions, and changes in the form of the detail of the devices, systems, and/or methods shown may be made by those skilled in the art without departing from the scope of the invention. Consequently, the scope of the invention should not be limited to the foregoing description, but should be defined by the appended claims.

What is claimed is:

1. A method for detecting a fraudulent check transaction, comprising:
    obtaining information about a MICR account number field associated with a current check transaction, said MICR field having a sequence of digits or characters;
    searching for a pattern of change in sequences of digits or characters among the current MICR account number field and at least one existing MICR account number field associated with at least one previous check transaction, said at least one existing MICR account number field having the same number of digits or characters as the new MICR account number field; and
    determining, via at least one processor, that the current check transaction is likely a fraudulent transaction if the change in sequences of digits or characters comprises a change involving a selected digit or character, and characterizing risk associated with the likely fraudulent transaction based at least in part on the change involving the selected digit or character.

2. The method of claim 1, wherein the change involving the selected digit or character is the only change in sequences of digits or characters.

3. The method of claim 2, wherein the change involving the selected digit or character comprises an increment or decrement of the selected digit or character.

4. The method of claim 1, wherein the selected digit or character is part of an account number portion of the corresponding MICR field.

5. The method of claim 1, wherein the selected digit or character is part of a routing transit number portion of the corresponding MICR field.

6. The method of claim 1, wherein the selected digit or character is part of a driver license number.

7. The method of claim 1, wherein information about the new MICR field is obtained via a phone-based transaction.

8. The method of claim 1, wherein information about the at least one existing MICR field is obtained from a database.

9. The method of claim 1, wherein the at least one previous check transaction comprises a check transaction that occurred during a specified period in the past.

10. The method of claim 9, wherein the specified period comprises seven days.

11. A method for processing a check transaction, comprising:
    obtaining information about a new MICR field associated with a first check transaction;
    obtaining a pattern of change among the new MICR field and at least one existing MICR field associated with at least one previous check transaction, said at least one existing MICR field having the same number of digits or characters as the new MICR field; and
    assigning, via at least one processor, a first risk value to the first transaction if the pattern of change involves a change in selected one or more digits or characters of a selected portion of the new MICR field and the at least one existing MICR field, wherein the first risk value is based at least in part on the change in the selected one or more digits or characters.

12. The method of claim 11, wherein the information about the new MICR field is obtained via a point-of-sale device.

13. The method of claim 11, wherein information about the new MICR field is obtained via an internet-based website configured to perform check transactions.

14. The method of claim 11, wherein information about the new MICR field is obtained via a phone-based transaction.

15. The method of claim 11, wherein information about the selected MICR field is obtained from a database.

16. The method of claim 11, wherein the at least one previous check transaction comprises at least one transaction that occurred during a specified period in the past.

17. The method of claim 16, wherein the specified period comprises seven days.

18. The method of claim 11, wherein the change in selected one or more digits or characters is the only change in change among the new MICR field and at least one existing MICR field.

19. The method of claim 11, wherein the change in selected one or more digits or characters comprises a change in selected one digit or character.

20. The method of claim 11, wherein the first check transaction is considered to be fraudulent if the change in selected one digit or character comprises an increment or decrement in the value of the selected one digit or character.

21. The method of claim 11, wherein the selected portion of the new MICR field and the at least one existing MICR field comprises a routing transit number.

22. The method of claim 11, wherein the selected portion of the new MICR field and the at least one existing MICR field comprises an account number field.

23. The method of claim 11, further comprising determining how to proceed with the first check transaction based at least in part on the first risk value.

24. The method of claim 23, wherein the first check transaction is authorized if the first risk value is within a range of an acceptable risk.

25. The method of claim 23, wherein the first check transaction is declined if the first risk value is within a range of an unacceptable risk.

26. The method of claim 23, wherein additional information about the first check transaction is requested if the first risk value is within a range of a questionable risk.

27. The method of claim 11, further comprising providing a communication with a party requesting the first check transaction based at least in part on the first risk value.

28. The method of claim 27, wherein the communication comprises a message transmitted to a point-of-sale device.

29. The method of claim 28, wherein the message includes a request to inspect the check for signs of alteration of one or more digits or characters of the first MICR field.

30. The method of claim 28, wherein the message includes a request to call a telephone number to proceed with the first check transaction.

31. The method of claim 27, wherein the communication comprises a message transmitted to the party using an internet-based website to request the first check transaction.

32. The method of claim 31, wherein the message includes a request to re-enter the first MICR field.

33. The method of claim 31, wherein the message includes a request to call a telephone number to proceed with the first check transaction.

34. A system for processing a check transaction, comprising:
an interface component configured to obtain information about a new MICR field associated with a first check transaction; and
a risk component with at least one processor configured to:
obtain a pattern of change among the new MICR field and at least one existing MICR field associated with at least one previous check transaction, said at least one existing MICR field having the same number of digits or characters as the new MICR field; and
assign a first risk value to the first transaction if the pattern of change involves a change in selected one or more digits or characters of a selected portion of the new MICR field and the at least one existing MICR field, wherein the first risk value is based at least in part on the change in the selected one or more digits or characters.

35. The system of claim 34, wherein the information about the new MICR field is obtained via a point-of-sale device.

36. The system of claim 34, wherein information about the new MICR field is obtained via an internet-based website configured to perform check transactions.

37. The system of claim 34, wherein information about the selected MICR field is obtained from a database.

38. The system of claim 34, wherein the at least one previous check transaction comprises at least one transaction that occurred during a specified period in the past.

39. The system of claim 38, wherein the specified period comprises seven days.

40. The system of claim 34, wherein the change in selected one or more digits or characters is the only change in change among the new MICR field and at least one existing MICR field.

41. The system of claim 34, wherein the change in selected one or more digits or characters comprises a change in selected one digit or character.

42. The system of claim 34, wherein the first check transaction is considered to be fraudulent if the change in selected one or more digits or characters comprises an increment or decrement in the value of the selected one digit or character.

43. The system of claim 34, wherein the selected portion of the new MICR field and the at least one existing MICR field comprises a routing transit number.

44. The system of claim 34, wherein the selected portion of the new MICR field and the at least one existing MICR field comprises an account number field.

45. The system of claim 34, further comprising a processor configured so as to determine how to proceed with the first check transaction based at least in part on the first risk value.

46. The system of claim 45, wherein the first check transaction is authorized if the first risk value is within a range of an acceptable risk.

47. The system of claim 45, wherein the first check transaction is declined if the first risk value is within a range of an unacceptable risk.

48. The system of claim 45, wherein additional information about the first check transaction is requested if the first risk value is within a range of a questionable risk.

49. The system of claim 34, further comprising an interface component configured so as to provide communication with a party requesting the first check transaction based at least in part on the first risk value.

50. The system of claim 49, wherein the communication comprises a message transmitted to a point-of-sale device.

51. The system of claim 50, wherein the message includes a request to inspect the check for signs of alteration of one or more digits or characters of the first MICR field.

52. The system of claim 50, wherein the message includes a request to call a telephone number to proceed with the first check transaction.

53. The system of claim 49, wherein the communication comprises a message transmitted to the party using an internet-based website to request the first check transaction.

54. The system of claim 53, wherein the message includes a request to re-enter the first MICR field.

55. The system of claim 53, wherein the message includes a request to call a telephone number to proceed with the first check transaction.

56. A method for detecting a fraudulent check transaction, comprising:
obtaining information about a current check transaction, said information having a sequence of digits or characters;
searching for a pattern of change in sequences of digits or characters among the current check transaction and one or more past check transactions; and
determining, via at least one processor, that the current check transaction is likely a fraudulent transaction if the change in sequences of digits or characters comprises a change involving a selected digit or character, and characterizing risk associated with the likely fraudulent transaction based at least in part on the change involving the selected digit or character.

\* \* \* \* \*